(12) United States Patent
Vartiainen

(10) Patent No.: US 7,231,194 B2
(45) Date of Patent: Jun. 12, 2007

(54) LOCALIZATION OF NARROWBAND SIGNALS

(75) Inventor: Johanna Vartiainen, Haukipudas (FI)

(73) Assignee: Nokia Corporation, Espoo (FI)

( * ) Notice: Subject to any disclaimer, the term of this patent is extended or adjusted under 35 U.S.C. 154(b) by 490 days.

(21) Appl. No.: 10/889,302

(22) Filed: Jul. 13, 2004

(65) Prior Publication Data

US 2005/0272376 A1 Dec. 8, 2005

(30) Foreign Application Priority Data

Jun. 7, 2004 (FI) .................................. 20045212

(51) Int. Cl.
*H04B 1/16* (2006.01)
*H04B 7/00* (2006.01)
*H04Q 7/20* (2006.01)

(52) U.S. Cl. ...................... 455/229; 455/266; 455/450; 455/452.2; 455/227

(58) Field of Classification Search ................ 455/229, 455/266, 227, 296, 450, 452.1, 452.2
See application file for complete search history.

(56) References Cited

U.S. PATENT DOCUMENTS

| | | | | |
|---|---|---|---|---|
| 5,574,459 | A * | 11/1996 | Burgay et al. ................. | 342/40 |
| 6,295,444 | B1 * | 9/2001 | Morande et al. ............. | 455/218 |
| 7,076,220 | B2 * | 7/2006 | Backes et al. ............ | 455/161.1 |
| 7,155,230 | B2 * | 12/2006 | Tsien ........................... | 455/450 |
| 2002/0068536 | A1 | 6/2002 | David et al. ............. | 455/161.1 |
| 2002/0181417 | A1 * | 12/2002 | Malhotra et al. ........... | 370/329 |
| 2004/0037307 | A1 * | 2/2004 | Henttu et al. ................ | 370/441 |
| 2006/0062184 | A1 * | 3/2006 | Saarnisaari et al. ......... | 370/335 |

FOREIGN PATENT DOCUMENTS

| | | |
|---|---|---|
| EP | 0 560 475 A1 | 9/1993 |
| WO | WO 2004 006450 A1 | 1/2004 |

OTHER PUBLICATIONS

Henttu P. and Aromaa S. (2002) "Consecutive Mean Excision Algorithm", Proceedings of IEEE International Symposium on Spread Spectrum Techniques and Applications, vol. 2, pp. 450-454.
Saarnisaari H. and Henttu P. (2003) "Impulse detection and rejection methods for radio systems", Proceedings of IEEE Military communications conference MILCOM 2003, Boston, MA USA.

* cited by examiner

*Primary Examiner*—Duc M. Nguyen
(74) *Attorney, Agent, or Firm*—Squire, Sanders & Dempsey L.L.P.

(57) ABSTRACT

The invention relates to detecting a narrowband signals from received signals. According to the different aspects of the invention, a sample set is first formed from received signals, whereby elements of the sample set represent their absolute values, and a lower reference value and an upper reference value are determined. Then adjacent samples exceeding the lower reference value are grouped in the same cluster. The purpose of the clustering is to group signals possibly originating from the same source together. Then, if at least one of these clustered samples exceeds also the upper reference value, it is most probable that the cluster is caused by a narrowband signal. The order of the determination steps can be varied according to the different aspects of the invention.

30 Claims, 4 Drawing Sheets

LOCALIZATION OF NARROWBAND SIGNALS

FIELD OF THE INVENTION

The invention relates to detection of radio signals, and particularly to localization of narrowband signals.

BACKGROUND OF THE INVENTION

As wireless communication becomes increasingly common, more new frequency ranges are needed for different wireless systems. In a particular area, several of the following systems and frequency ranges may be operated simultaneously: EGSM 900 (880 to 960 MHz), GSM 1800 (1710 to 1880 MHz), GSM 1900 (1850 to 1990 MHz), WCDMA 2000 (1920 to 2170 MHz), US-GSM 850 (824 to 894 MHz), US-WCDMA 1900 (1850 to 1990 MHz) and US-WCDMA 1700/2100 (Tx 1710 to 1770 MHz, Rx 2110 to 2170 MHz). Moreover, different wireless local area network systems, like IEEE 802.11 and 802.16, and the wireless Bluetooth system are operating within the so-called unlicensed frequency range of 2400 to 2483.5 MHz. Furthermore, GPS satellite positioning system, having the frequency range of 1227/1575 MHz, is operating on a frequency range close to those used in other wireless systems.

In wireless transmission, both intra-system signals and intersystem signals, as well as noise, may interfere with the reception. Consequently, the quality of the received signals may be affected by quick interference due to various factors, such as multipath propagation, fading of transmitted signals, shadowing, near-far effect and co-channel interference. The interfering signals disturb the signal-processing methods used in telecommunications systems, due to which estimating the power or the bandwidth of a received signal, for instance, may be unsuccessful.

As different wireless systems, particularly those operating within the unlicensed frequency range, are becoming more commonly used, the receiver control necessitates, not only detection of interfering signals, but also estimation of the bandwidth, as well as the frequencies, of unknown narrowband signals for different purposes. When a signal is considered interference, the knowledge of that may be used to aid the interference excision, e.g., the transform selective interference suppression algorithm (TSISA). It may also be desirable to detect if a narrowband signal is present within a wideband signal, e.g., in systems with overlapping frequency ranges.

A commonly known method of frequency estimation of unknown narrowband signals, typically used in radar systems, is based on thresholding the radar signals with hysteresis. A drawback of the method is that the threshold setting is based on the noise present in the system. However, the estimation of noise increases the complexity of the algorithm and the estimation of noise may even be an impossible task in severe interference environment.

The forward consecutive mean excision (FCME) algorithm has been proposed earlier as an interference excision algorithm. Filtering the disturbing interference is often a prerequisite for the receivers to be able to operate at a sufficient accuracy. For instance in FFT (Fast Fourier Transformation) band-stop filters used in receivers it is important to find the suitable threshold value level, because the performance of the band-stop filter depends to a great extent on the correct threshold level setting.

The FCME algorithm is "blind" in the sense that it does not need to know the noise level in advance. The efficient FCME algorithm sets an excision threshold iteratively based on a threshold parameter. The threshold given by the FCME algorithm separates the set of samples into two sets. The samples below the threshold are caused by the noise and possibly by a spread spectrum signal. The samples above the threshold are caused by different interference impulses and signals and unknown narrowband signals. Some embodiments of the FCME algorithm are given in patent application PCT/F103/00536.

Although the FCME algorithm can efficiently detect interfering signal samples above the given threshold, it can locate narrowband signals only very approximately. Frequency components caused by the noise can exceed the threshold and cause false signals to be detected. In the noisy data, the signal can also be broken due to the possible destructive addition of the noise and the signal. The result is that the definition of the bandwidth and the frequencies of the signal may fail.

BRIEF DESCRIPTION OF THE INVENTION

Now it has been invented an improved method and an apparatus implementing the method for detecting narrowband signals. As different aspects of the invention methods, receivers, a base station and a mobile station of a wireless telecommunication system, and computer software products are introduced, which are characterized in what is disclosed in the independent claims.

Some embodiments of the invention are disclosed in the dependent claims.

The first aspect of the invention includes a method for detecting a narrowband signal. The method comprises: forming a sample set from received signals, whereby elements of the sample set represent their absolute values; determining a lower reference value and an upper reference value; comparing the absolute values of the sample set with the lower threshold value; in response to detecting adjacent sample elements having absolute values greater than the lower reference value, arranging adjacent sample elements exceeding the lower reference value in at least one cluster; comparing the absolute values of the greatest sample element in said at least one cluster with the upper reference value; and in response to detecting said greatest sample element having an absolute value greater than the upper reference value, accepting a narrowband signal comprising the detected adjacent sample elements to be detected.

According to the second aspect of the invention, the same result is achieved by a method for detecting a narrowband signal in a telecommunications system, which method comprises: forming a sample set from received signals, whereby elements of the sample set represent their absolute values; determining a lower reference value and an upper reference value; comparing the absolute values of the sample set with the upper reference value; in response to detecting at least one sample element having an absolute value greater than the upper reference value, comparing the absolute values of the sample element on either side of the detected at least one sample element with the lower reference value; and in response to detecting at least one side sample element of said detected at least one sample element having an absolute value greater than the lower reference value, accepting a narrowband signal comprising a cluster of the detected adjacent sample elements to be detected.

Thus, the basic idea of the invention is to improve the original FCME algorithm by introducing two reference values, which are determined such that the problems caused by the noise and groundless separation of received signals when crossing the threshold continually and causing false signals are greatly reduced or even totally eliminated. In the improved method, adjacent samples exceeding the lower threshold, i.e. the lower reference value, are grouped in the same cluster. The purpose of the clustering is to group signals possibly originating from the same source together. Then, if at least one of these clustered samples exceeds also the upper reference value, it is most probable that the cluster is caused by a narrowband signal. The order of the determination steps can be varied according to the different aspects of the invention.

The invention also relates to a receiver comprising means for forming a sample set from received signals, whereby elements of the sample set represent their absolute values; means for determining a lower reference value and an upper reference value; means for comparing the absolute values of the sample set with the lower threshold value; means for arranging adjacent sample elements exceeding the lower reference value in at least one cluster; means for comparing the absolute value of the greatest sample element in said at least one cluster with the upper reference value; and means for accepting a narrowband signal to be detected if said greatest sample element has an absolute value greater than the upper reference value.

According to the second aspect of the invention, the receiver comprises means for forming a sample set from received signals, whereby elements of the sample set represent their absolute values; means for determining a lower reference value and an upper reference value; means for comparing the absolute values of the sample set with the upper reference value; means for comparing the absolute values of the sample element on either side of the detected at least one sample element with the lower reference value if at least one sample element having an absolute value greater than the upper reference value is detected; and means for accepting a narrowband signal comprising a cluster of adjacent sample elements to be detected if at least one side sample element of said detected at least one sample element has an absolute value greater than the lower reference value.

A plurality of advantages is achieved with the methods and receivers according to the invention. The localization capability of the FCME algorithm is strongly improved with reasonable increase in computational complexity. Furthermore, as the FCME algorithm has previously been applied to interference suppression, the same algorithm can now be applied to unknown signal detection as well, which reduces the overall computational complexity. Moreover, the methods operate in real-time, and since the original FCME algorithm is "blind", i.e. it does not need to know the noise level or any advance information on the unknown signals, detecting said signals with the presented method can also be carried out "blind".

LIST OF DRAWINGS

In the following the invention will be described in greater detail in connection with preferred embodiments, with reference to the attached drawings, in which FIG. 1 shows an example of a telecommunications system according to the proposed solution;

DESCRIPTION OF EMBODIMENTS

Preferred embodiments of the invention can be applied to telecommunications systems that comprise one or more base stations and a number of terminals communicating with one or more base stations. One such a telecommunications system is the broadband WCDMA radio system employing spread-spectrum data transmission. In the following, embodiments are described by using the radio system of FIG. 1 as the example without being restricted to this, as will be obvious to a person skilled in the art.

Figure 1:
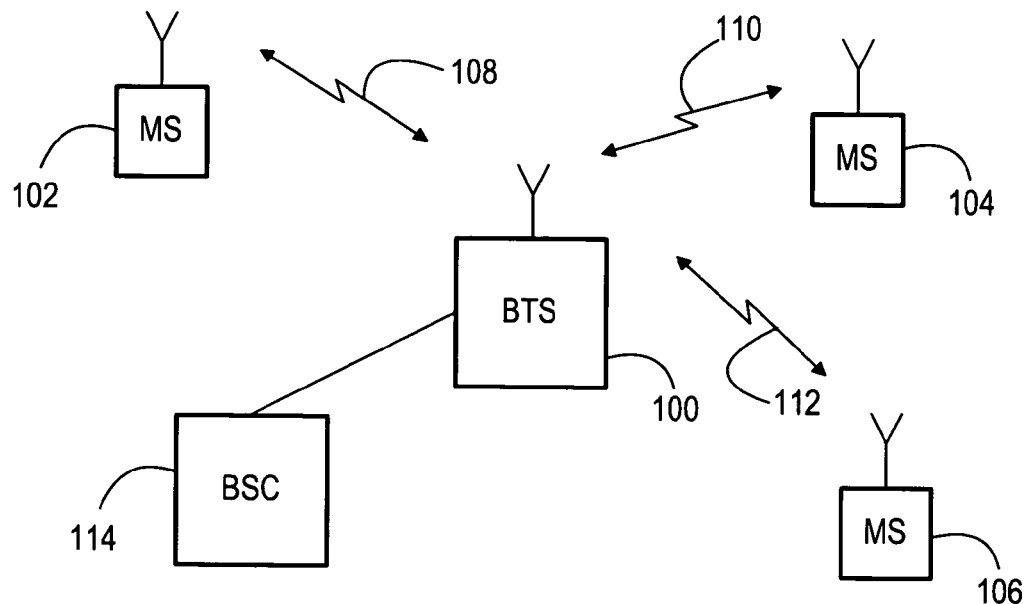

The structure of a telecommunications system can be in essence as shown in FIG. 1. The telecommunications system comprises a base station 100 and a plurality of generally mobile subscriber stations 102 to 106, which have bi-directional connections 108 to 112 to the base station 100. The base station 100 switches the connections of the terminal equipment 102 to 106 to a base station controller 114, which forwards them to other parts of the system and to a fixed network. The base station controller 114 controls the operation of one or more base stations. The base station controller 114 monitors the quality of the radio signal and the transmission power, and takes care of the handover of the mobile station. In addition to the electronic components required for transmitting and receiving radio communication, the base station 100 also comprises signal processors, ASIC circuits and general-purpose processors, which take care of data transmission to the base station controller 114 and control the operation of the base station 100. The base station 100 may comprise one or more transmitter/receiver units. The receiver of the proposed solution can be placed in connection with either the base station 100 or the mobile subscriber stations 102 to 106.

Figure 2:
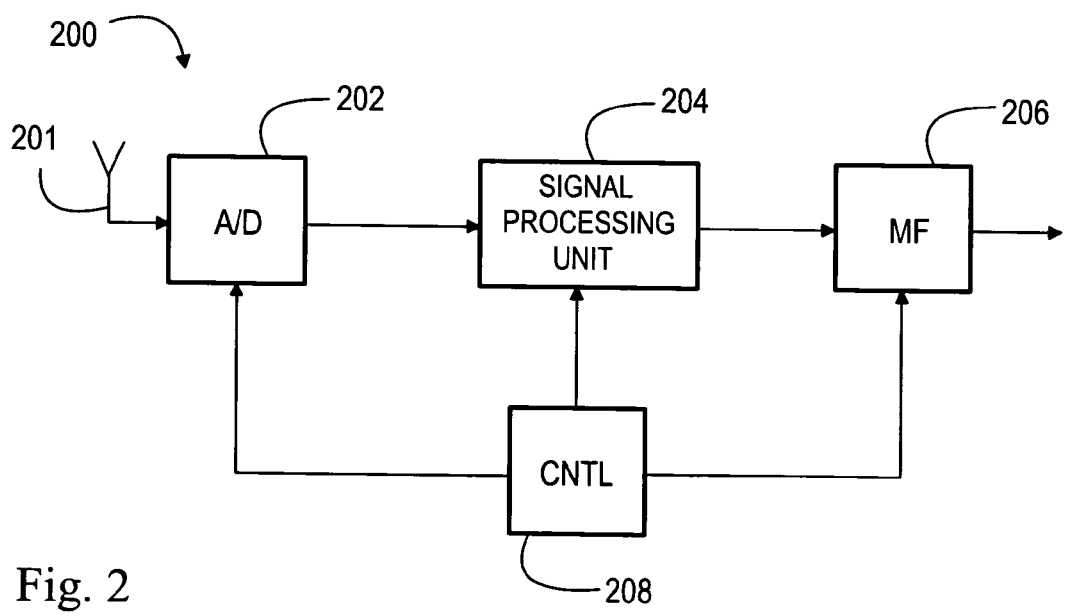
FIG. 2 shows an example of a receiver according to the proposed solution.

FIG. 2 shows an example of a receiver 200 according to the proposed solution. The receiver comprises an A/D converter 202, a signal-processing block 204, a matched filter 206 and a control unit 208. The receiver may also comprise other means implementing receiver operations, such as speech and channel encoders, modulators and RF parts. In addition, the device comprises an antenna 201, by means of which signals are transmitted and received.

All operations of the receiver 200 are controlled by the control unit 208, which is typically implemented by means of a microprocessor and software or separate components. The A/D converter 202 converts the continuous signal received by the receiver 200 into a digital form. The matched filter 206 is a specific filter adapted to let only the desired signal pass through with slight signal attenuation and to block all other waveforms (including noise). Prior to the matched filter 206 the signals are at chip level and after the adapted filter at symbol level. The signal-processing block 204 is implemented by means of ASIC circuits or a microprocessor and software. In the proposed solution it is possible to place also other components between the signal-processing block 204 and the matched filter 206.

In FIG. 2, sampling, controlled by the control unit 208, in the A/D converter 202 takes place by reading the value of a continuous signal at given intervals. This sampling interval is generally constant in digitizing each signal. After digitizing the signal, the signal-processing block 204 performs operations controlled by the control unit 208.

When operating the original FCME algorithm, a sample set is first formed in the signal-processing block 204 from the signals received from the A/D converter 202, and an absolute value set is formed from the absolute values of the sample set elements. In the signal-processing block 204, the elements of the absolute value set are arranged in the ascending order, a threshold parameter is set, and subsequently, the number of reference set elements to be formed is determined, the reference set comprising a predetermined number of elements of the absolute value set in the order of magnitude. In addition, a reference value is determined in the signal-processing block 204, the reference value being the product of the mean (or the median) of the absolute value set and a predetermined threshold parameter.

When the threshold parameter is determined, the sample set is assumed to be Gaussian-distributed with zero mean, whereby the amplitude of the sample sequence is Rayleigh-distributed. In practice, the desired set is not precisely Gaussian, but the method is simplified by this assumption. This situation is achieved in multiple-user DS-CDMA systems. If, on the other hand, there are only a few users, or the power control does not work, the mean of the variables deviates from zero, whereby the amplitude is Rice-distributed. The method can still be used in that case, too.

The threshold parameter is obtained from Rayleigh distribution. Selection of a suitable threshold parameter is affected by the method used for computing the reference value in a later phase. If, for instance, the mean of the reference set is used for computing the reference value and if it is desired that 1% of the sample set elements be deleted, the threshold parameter is 2.42. This is a typical value used in the original FCME algorithm. The assumption that the desired set is Gaussian with zero mean is sufficient for determining the threshold parameter. The threshold parameter is independent of the Gaussian distribution variance.

Next, in the signal-processing block 204, the value of the greatest element of the reference set and the reference value are compared with each other, after which the signal-processing block 204 increases the number of reference set elements for forming a new reference set, if the greatest element of the reference set is smaller than the reference value. The signal-processing block 204 reiterates these measures until a predetermined ending condition is fulfilled. Subsequently, an accepted absolute value set and a corresponding reference set are formed in the signal-processing block 204 by deleting the greatest element from the remaining reference set.

Since the above-mentioned ending condition is fulfilled when the greatest element of the reference set is greater than the reference value, the measures taken in the receiver 200 cause only the noiseless samples to be accepted from a received signal containing various interference. Thus, the idea is to add the second greatest element of the absolute value set to the reference formed from the elements of the absolute value set each time the greatest element of the reference set is greater than the reference value. As long as the greatest element of the reference set is greater than the reference value, it is certain that the second greatest element is noiseless. The above method is particularly suitable for cancelling interference, since the ability of the method to endure interference is good.

Because the original FCME algorithm uses only one threshold, the threshold parameter of the original FCME algorithm has to be high enough. On the other hand, the threshold parameter cannot be too high, which would lead to an excessively high reference value and acceptance of samples. If the threshold parameter is too small, samples caused by the noise can cross the threshold continually and cause false signals. Consequently, the original FCME algorithm is not very efficient to locate narrowband signals.

In order to avoid this drawback, an improved method has now been invented. The improved method is based on the idea that the adjacent samples exceeding the threshold, i.e. the reference value, are grouped in the same cluster. The purpose of the clustering is to group signals possibly originating from the same source together. Thereafter, a condition is used to decide if the samples in the cluster are caused by a narrowband signal. If the condition fulfils, the sample cluster is accepted and the bandwidth and the center-frequency of a narrowband signal can be determined. Otherwise, the cluster is ignored.

The method is based on the usage of two threshold parameters. Correspondingly, the FCME algorithm calculates an upper and a lower threshold parameter and their respective reference levels. When the algorithm finds a sample cluster above the lower reference level, the cluster is accepted only if the cluster includes at least one sample above the upper reference level. The method assumes that if the samples of the cluster are above the lower reference level, but below the upper reference level, the cluster is caused by the noise, and it can be ignored.

Again, if the sample set is assumed to be Gaussian with zero mean, the upper and the lower threshold parameters are obtained from Rayleigh distribution. If, for instance, the mean of the reference set is used for computing the reference value and if it is desired that 0.1% of the sample set elements be deleted, the upper threshold parameter is advantageously 2.97. For the lower threshold parameter it can be set that 5% of the sample set elements are to be deleted, whereby the lower threshold parameter receives a value of 1.95.

Figure 3:
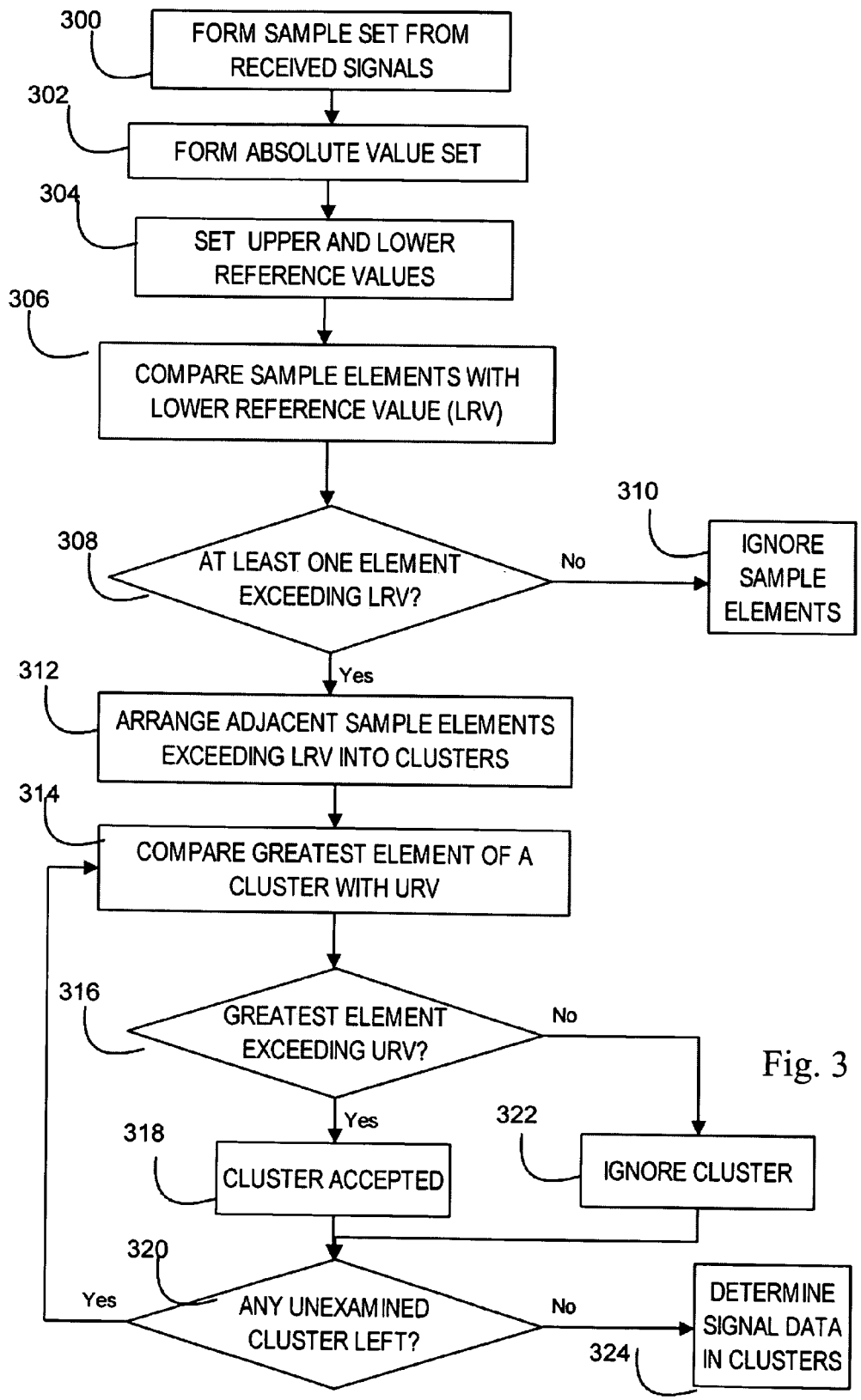
FIG. 3 shows a flow chart of a signal-processing method according to the first aspect of the invention.

FIG. 3 shows a flow chart of a signal processing method according to an embodiment of the invention. In step 300, a sample set is formed from the received signals. The received signal comprises thermal noise and interference signals, some of them possibly caused by a narrowband signal. An object of the method is to localize the narrowband signals from the received signal and determine their properties (i.e. for example, the center-frequency and the bandwidth) prior to processing the received signal further. This is implemented by dividing the received chip-level samples into a desired set and an interference set, which is done by means of a threshold value. The desired set is thus the remaining sample set, from which the interferences have been cancelled. The sample set formed in step 300 is assumed to be Gaussian with zero mean, whereby the amplitude of the sample sequence is Rayleigh-distributed.

After forming the sample set in step 300, the process proceeds to step 302, in which an absolute value set is formed from the absolute values of the sample set elements, the absolute value set consisting of the absolute values of the desired set being Rayleigh-distributed. In step 304, an upper and a lower reference values are set by multiplying the threshold parameters obtained from Rayleigh distribution with the mean or median of the sample set. Thus, the mean or median of the reference set is selected for computing the reference value. However, selection of the median leads to an easier method, because it is simpler to compute than the mean value by taking only the middlemost value of the reference set.

Next, in step 306, the sample elements are compared with the lower reference value, and as a result of this comparison it is checked in step 308, whether the sample set includes any samples having a value greater than the lower reference value. If no samples exceeding the lower reference value are found, the sample set can be ignored in step 310. On the other hand, if samples exceeding the lower reference value are found in step 308, all adjacent samples exceeding the lower reference value are arranged in clusters, i.e. groups of adjacent sample elements, in step 312.

Next the clusters are examined, whether any of them can be interpreted as a narrowband signal. For this purpose, in step 314, the greatest sample element of a cluster is then compared with the upper reference value (URV). In step 316, it is observed whether the greatest sample element of the cluster is greater than the upper reference value. If the greatest sample element of the cluster does not exceed the upper reference value, it is concluded that the sample cluster does not include any narrowband signal and the sample elements of the cluster can be ignored in step 322.

On the other hand, if the greatest sample element of the cluster exceeds the upper reference value, said cluster is accepted to correspond a narrowband signal in step 318. Then it is checked, in step 320, if there are any more clusters to be examined. Step 320 is also performed, if the cluster was ignored in step 322. If there are still unexamined clusters, the above procedure is started again in step 314 for the next sample cluster. If no unexamined clusters exist, one can then move on to step 324 to process the detected sample clusters further in a desired manner, for example, in order to estimate the center-frequencies and the bandwidth of the signals.

Thus, by applying two threshold parameters with suitable values, it is possible to use the FCME algorithm for unknown signal detection with only moderate increase in computational complexity. The presented method operates in real-time, and since the original FCME algorithm is "blind", i.e. it does not need to know the noise level or any advance information on the interference, detecting unknown signals with the presented method is also done "blind". Furthermore, since the sample set variance does not have to be known when the threshold values are determined, the sample set can also be a direct sequence signal, for example, which is below Gaussian noise with zero mean (thermal noise). Such is the case for instance in spread-spectrum systems, where signal-noise ratio at chip level is below zero decibel.

It is to be noted that the method can be implemented by altering the order of at least some of the steps depicted in FIG. 3. For example, the elements of the sample set can first be compared with the upper reference value, and when an element having a greater value than the upper reference value is observed, a cluster of adjacent elements around the observed element can then be searched for. However, if reliable results are desired, this alternative would increase computational complexity to some extent, since backward search including sequential detection should be applied.

Figure 4:
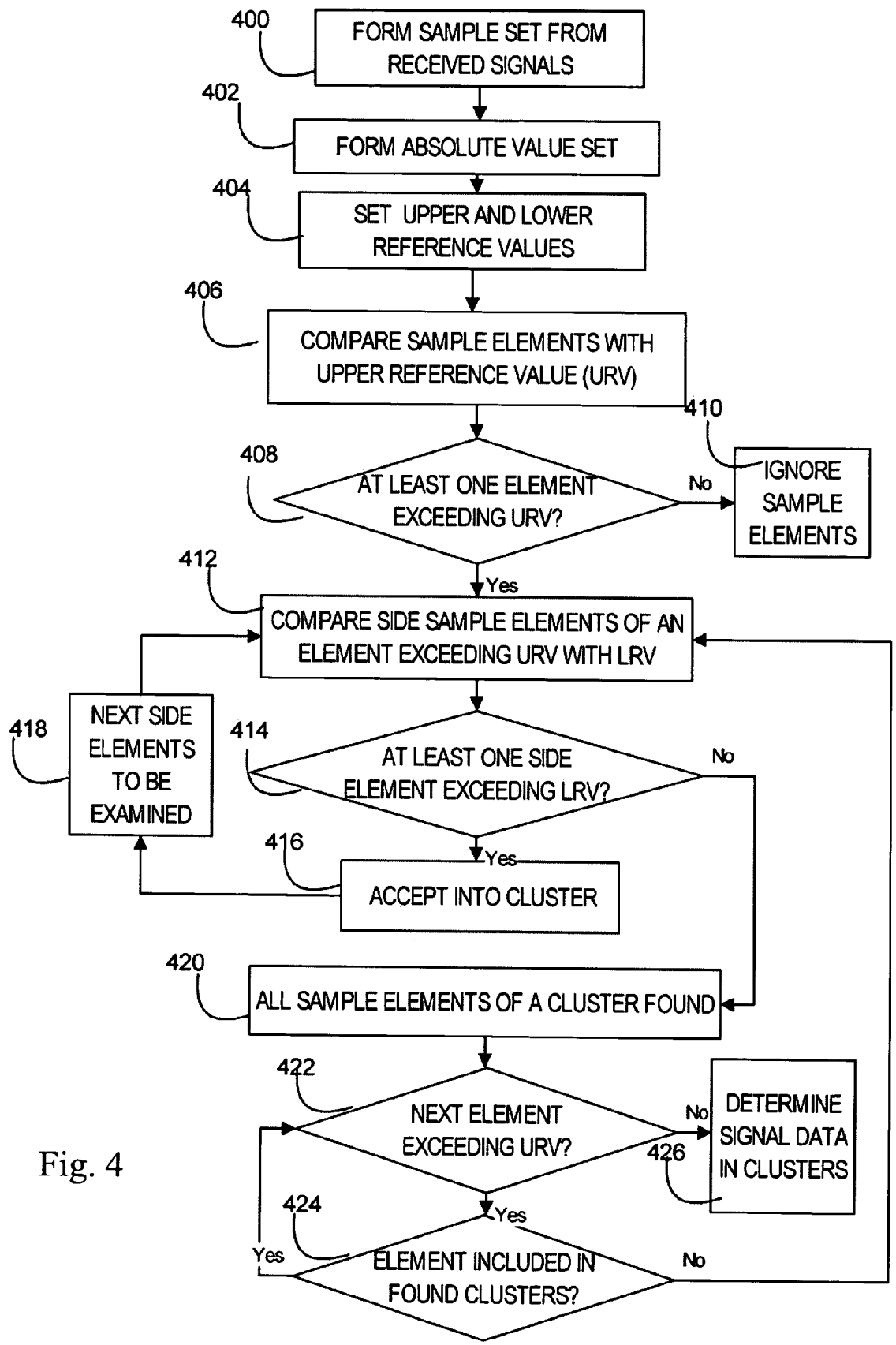
FIG. 4 shows a flow chart of a signal-processing method according to the second aspect of the invention.

FIG. 4 shows a flow chart of a signal processing method according to this alternative embodiment of the invention. The first steps, 400, 402 and 404, are equal to the above-described method: in step 400, a sample set is formed from the received signals, in step 402, an absolute value set is formed from the absolute values of the sample set elements, and in step 404, an upper and a lower reference values are set by multiplying the threshold parameters obtained from Rayleigh distribution with the mean or median of the sample set.

Next, in step 406, the sample elements are compared with the upper reference value, and as a result of this comparison it is checked in step 408, whether the sample set includes any samples having a value greater than the upper reference value. If no samples exceeding the upper reference value are found, the sample set is interpreted not to include any narrowband signal and the sample set can be ignored in step 410. If samples exceeding the upper reference value are found in step 408, each of them is preferably further examined according to the following procedure.

Let the sample to be examined be denoted as sample N. In step 412, sample elements on each side of sample N, i.e. sample N−1 and sample N+1, are compared with the lower reference value. If in step 414 it is observed that at least either of the sample elements (N−1 or N+1) has a value greater than the lower reference value, the samples N and N−1 and/or N+1 can be accepted to form a cluster in step 416. Then in step 418, the adjacent sample element(s) (N−2 and/or N+2) on the side(s) having a value greater than the lower reference value in step 414 are attached for another comparison in step 412. This loop is reiterated until it is observed in step 414 that neither of the sample elements to be compared (N−x and/or N+x) has a value greater than the lower reference value, whereby it is concluded in step 420 that all sample elements of the cluster are gathered together.

In step 422, next sample exceeding the upper reference value is searched for. If the next sample exists, it is checked in step 424, whether the sample has already been included in any of the examined clusters, whereby the sample can be ignored and the following sample is again searched for in step 422. If the next sample has not been included in any of the examined clusters, the loop reiteration of steps 412–418 is carried out for said sample as well. The procedure is continued until it is observed in step 422 that all samples exceeding the upper reference value have been examined. When no unexamined sample exists, one can then move on to step 424 to process the detected sample clusters further in a desired manner, for example, in order to estimate the center-frequencies and the bandwidth of the signals.

Figure 5A:
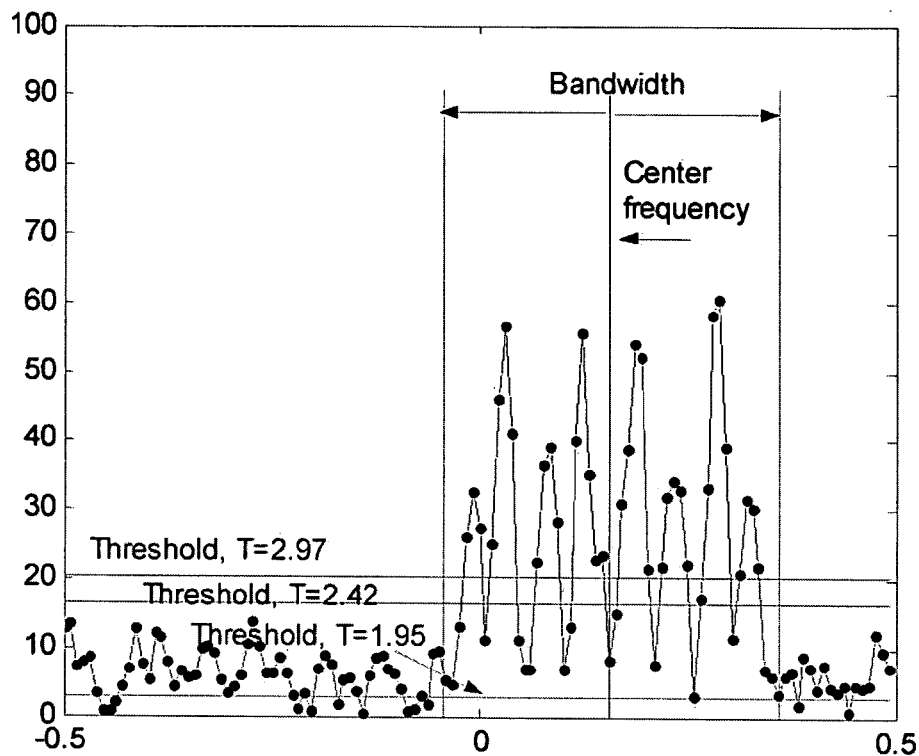
FIGS. 5a and 5b show some example results of the implementation of the method.
Figure 5B:
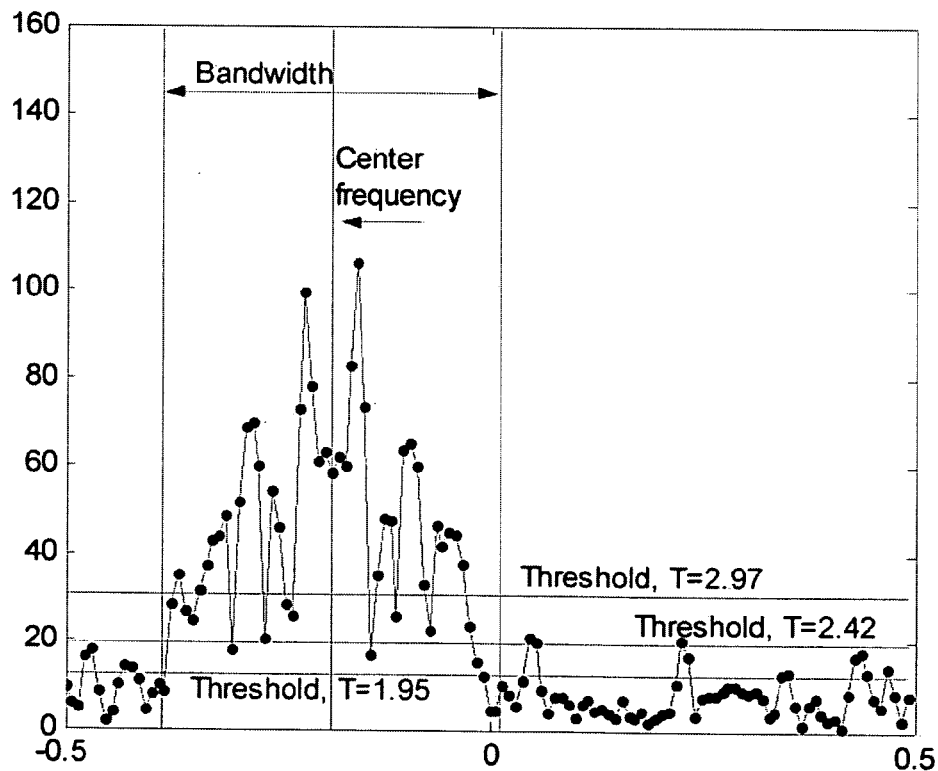

Some example results of the implementation of the above-presented method are shown in FIGS. 5a and 5b. In FIG. 5a, the method is applied to a raised-cosine (RC) filtered binary phase-shift keying (BPSK) signal with 40% of relative bandwidth. It can be seen that the original FCME algorithm (threshold in the middle, T=2.42) causes groundless separation of the signal and divides the RC-BPSK signal into 8 sets, since the signal level moves back and forth across the reference level, whereby the definition of the bandwidth of the signal becomes impossible. Instead, according to the improved method, the signal level does not fall below the lower reference value (lowest threshold, T=1.95) after the higher reference value (highest threshold, T=2.97) has been reached for the first time. The method is thus able to find the signal and the bandwidth and the center-frequency of the signal can be estimated essentially right as well.

FIG. 5b illustrates how the problems that the original FCME algorithm has with noise are strongly alleviated by the improved FCME algorithm. The original FCME algorithm both separates the RC-BPSK signal into 3 sets (back and forth movement across the reference level in the middle, T=2.42) and finds two extra signals caused by the noise. Again, the improved method detects that the signal level does not fall below the lower reference value (lowest threshold, T=1.95) after the higher reference value (highest threshold, T=2.97) has been reached for the first time. Consequently, the improved method defines both the number of the signals (which is one) and the bandwidth of the signal correctly.

The above embodiments are preferably implemented by executing computer software code stored in the memory (MEM) in a digital signal processor DSP functionally connected to the receiver. Thus, said means for carrying out the signal processing method described above are typically implemented as computer software code. The computer software may be stored into any memory means, such as the hard disk of a PC or a CD-ROM disc, from where it can be loaded into the memory of mobile station. The computer software can also be loaded through a network, for instance using a TCP/IP protocol stack. It is also possible to use hardware solutions or a combination of hardware and software solutions for implementing the inventive means.

Thus, according to the first aspect of the invention, the computer software may preferably comprise software code for forming a sample set from received signals, whereby elements of the sample set represent their absolute values; software code for determining a lower reference value and an upper reference value; software code for comparing the absolute values of the sample set with the lower reference value; software code for arranging adjacent sample elements exceeding the lower reference value in at least one cluster; software code for comparing the absolute value of the greatest sample element in said at least one cluster with the upper reference value; and software code for accepting a narrowband signal to be detected if said greatest sample element has an absolute value greater than the upper reference value.

According to the second aspect of the invention, the computer software may preferably comprise software code for forming a sample set from received signals, whereby elements of the sample set represent their absolute values; software code for determining a lower reference value and an upper reference value; software code for comparing the absolute values of the sample set with the upper reference value; software code for comparing the absolute values of the sample element on either side of the detected at least one sample element with the lower reference value if at least one sample element having absolute value greater than the upper reference value is detected; and software code for accepting a narrowband signal comprising a cluster of adjacent sample elements to be detected if at least one side sample element of said detected at least one sample element has an absolute value greater than the lower reference value.

It is also possible to use hardware solutions or a combination of hardware and software solutions to implement the inventive means. Accordingly, each of the computer program products above can be at least partly implemented as a hardware solution, for example as ASIC or FPGA circuits, in a hardware module comprising connecting means for connecting the module to a receiver and, when connected to the receiver, further to a communication device, such as a terminal or a base station of the network. Such a hardware module further comprises various means for performing said program code tasks, said means being implemented as hardware and/or software. The hardware module can be attached, for example, to an OBSAI (Open Base Station Architecture Initiative) base station or to a CRPI™ (Common Public Radio Interface) base station.

It is obvious for a person skilled in the art that as technology develops, the basic idea of the invention can be implemented in various ways. Thus, the invention and the embodiments thereof are not restricted to the above examples but may be modified within the scope of the claims.

The invention claimed is:

1. A method for detecting a narrowband signal in a telecommunications system, the method comprising:
   forming a sample set from received signals, whereby elements of the sample set represent absolute values of the received signals;
   determining a lower reference value and an upper reference value;
   comparing the absolute values of the sample set with the lower reference value;
   in response to detecting adjacent sample elements having absolute values greater than the lower reference value, arranging the adjacent sample elements exceeding the lower reference value in at least one cluster;
   comparing the absolute value of a greatest sample element in said at least one cluster with the upper reference value; and
   in response to detecting said greatest sample element having an absolute value greater than the upper reference value, accepting a narrowband signal comprising the detected adjacent sample elements to be detected.

2. A method according to claim 1, further comprising detecting if any unexamined clusters are left; and
   reiterating the step of comparing the absolute value of the greatest sample element in said unexamined clusters until all clusters have been examined in the received signals.

3. A method according to claim 1, further comprising computing the lower and the upper reference values by multiplying one of a mean and a median of the sample set by predetermined lower and upper threshold values, respectively.

4. A method according to claim 1, further comprising setting the lower and upper reference values according to a Rayleigh distribution.

5. A method according to claim 1, further comprising estimating a center-frequency and a bandwidth of the detected narrowband signal.

6. A method for detecting a narrowband signal in a telecommunications system, the method comprising:
   forming a sample set from received signals, whereby elements of the sample set represent absolute values of the received signals;
   determining a lower reference value and an upper reference value;
   comparing the absolute values of the sample set with the upper reference value;
   in response to detecting at least one sample element having an absolute value greater than the upper reference value, comparing absolute values of a sample element on either side of the detected at least one sample element with the lower reference value; and
   in response to detecting at least one side sample element of said detected at least one sample element having an absolute value greater than the lower reference value, accepting a narrowband signal comprising a cluster of the detected at least one sample element to be detected.

7. A method according to claim 6, further comprising comparing an absolute value of a sample element adjacent to the detected at least one side sample element with the lower reference value;
   in response to detecting said sample element adjacent to the detected at least one side sample element having an absolute value greater than the lower reference value, including said sample element adjacent to the detected at least one side sample element in the cluster; and
   reiterating the preceding steps until side elements having absolute values less than the lower reference value are detected on both sides of at least one sample element having an absolute value greater than the upper reference value.

8. A method according to claim 7, further comprising detecting if any unexamined sample element having an absolute value greater than the upper reference value is left; and reiterating the comparison of side sample elements for said unexamined sample elements having absolute values greater than the upper reference value until all clusters have been detected in the received signals.

9. A method according to claim 6, further comprising computing the lower and the upper reference values by multiplying one of a mean and a median of the sample set by predetermined lower and upper threshold values, respectively.

10. A method according to claim 6, further comprising setting the lower and upper reference values according to a Rayleigh distribution.

11. A method according to claim 6, further comprising estimating a center-frequency and a bandwidth of a detected narrowband signal.

12. A receiver, comprising:
means for forming a sample set from received signals, whereby elements of the sample set represent absolute values of the received signals;
means for determining a lower reference value and an upper reference value;
means for comparing the absolute values of the sample set with the lower reference value;
means for arranging adjacent sample elements exceeding the lower reference value in at least one cluster;
means for comparing the absolute value of a greatest sample element in said at least one cluster with the upper reference value; and
means for accepting a narrowband signal to be detected if said greatest sample element has an absolute value greater than the upper reference value.

13. A receiver according to claim 12, further comprising means for detecting if any unexamined clusters are left; and
means for reiterating the comparison of the greatest sample element in said unexamined clusters until all clusters have been examined in the received signals.

14. A receiver according to claim 12, further comprising means for computing the lower and the upper reference values by multiplying one of a mean and a median of the sample set by predetermined lower and upper threshold values, respectively.

15. A receiver according to claim 12, further comprising means for setting the lower and upper reference values according to Rayleigh distribution.

16. A receiver according to claim 12, further comprising means for estimating a center-frequency and a bandwidth of the detected narrowband signal.

17. A base station of a telecommunications system, wherein the base station comprises a receiver according to claim 12.

18. A mobile station of a telecommunications system, wherein the mobile station comprises a receiver according to claim 12.

19. A receiver for detecting a narrowband signal in a telecommunications system, the receiver comprising:
means for forming a sample set from received signals, whereby elements of the sample set represent absolute values of the received signals;
means for determining a lower reference value and an upper reference value;
means for comparing the absolute values of the sample set with the upper reference value;
means for comparing the absolute values of a sample element on either side of a detected at least one sample element with the lower reference value if at least one sample element having an absolute value greater than the upper reference value is detected; and
means for accepting a narrowband signal comprising a cluster of adjacent sample elements to be detected if at least one side sample element of said detected at least one sample element has an absolute value greater than the lower reference value.

20. A receiver according to claim 19, further comprising means for comparing the absolute value of a sample element adjacent to the detected at least one side sample element with the lower reference value;
means for including said sample element adjacent to the detected at least one side sample element in the cluster, if said sample element adjacent to the detected at least one side sample element has an absolute value greater than the lower reference value; and
means for reiterating the preceding steps until side elements having absolute values less than the lower reference value are detected on both sides of the at least one sample element having an absolute value greater than the upper reference value.

21. A receiver according to claim 20, further comprising means for detecting if any unexamined sample element having an absolute value greater than the upper reference value are left; and
means for reiterating the comparison of the side sample elements for said unexamined sample elements having absolute values greater than the upper reference value until all clusters have been detected in the received signals.

22. A receiver according to claim 19, further comprising means for computing the lower and the upper reference values by multiplying one of a mean and a median of the sample set by predetermined lower and upper threshold values, respectively.

23. A receiver according to claim 19, further comprising means for setting the lower and upper reference values according to a Rayleigh distribution.

24. A receiver according to claim 19, further comprising means for estimating a center-frequency and a bandwidth of the detected narrowband signal.

25. A base station of a telecommunications system, wherein the base station comprises a receiver according to claim 19.

26. A mobile station of a telecommunications system, wherein the mobile station comprises a receiver according to claim 19.

27. A hardware module for detecting a narrowband signal in a telecommunications system, the module comprising
connecting means for connecting a module to a receiver;
means for forming a sample set from received signals, whereby elements of the sample set represent absolute values of the received signals;
means for determining a lower reference value and an upper reference value;
means for comparing the absolute values of the sample set with the lower reference value;
means for arranging adjacent sample elements exceeding the lower reference value in at least one cluster;
means for comparing the absolute value of a greatest sample element in said at least one cluster with the upper reference value; and
means for accepting a narrowband signal to be detected if said greatest sample element has an absolute value greater than the upper reference value.

28. A hardware module for detecting a narrowband signal in a telecommunications system, the module comprising connecting means for connecting a module to a receiver;

means for forming a sample set from received signals, whereby elements of the sample set represent absolute values of the received signals;

means for determining a lower reference value and an upper reference value;

means for comparing the absolute values of the sample set with the upper reference value;

means for comparing the absolute values of a sample element on either side of a detected at least one sample element with the lower reference value if at least one sample element having an absolute value greater than the upper reference value is detected; and means for accepting a narrowband signal comprising a cluster of adjacent sample elements to be detected if at least one side sample element of said detected at least one sample element has an absolute value greater than the lower reference value.

29. A computer program stored in a computer readable medium, executable in a data processing device, for detecting a narrowband signal in a telecommunications system comprising:

software code for forming a sample set from received signals, whereby elements of the sample set represent absolute values of the received signals;

software code for determining a lower reference value and an upper reference value;

software code for comparing the absolute values of the sample set with the lower reference value;

software code for arranging adjacent sample elements exceeding the lower reference value in at least one cluster;

software code for comparing an absolute value of a greatest sample element in said at least one cluster with the upper reference value; and software code for accepting a narrowband signal to be detected if said greatest sample element has an absolute value greater than the upper reference value.

30. A computer program stored in a computer readable medium, executable in a data processing device, for detecting a narrowband signal in a telecommunications system, the receiver comprising:

software code for forming a sample set from received signals, whereby elements of the sample set represent absolute values of the received signals;

software code for determining a lower reference value and an upper reference value;

software code for comparing the absolute values of the sample set with the upper reference value;

software code for comparing absolute values of a sample element on either side of a detected at least one sample element with the lower reference value if at least one sample element having an absolute value greater than the upper reference value is detected; and software code for accepting a narrowband signal comprising a cluster of adjacent sample elements to be detected if at least one side sample element of said detected at least one sample element has an absolute value greater than the lower reference value.

* * * * *